(12) United States Patent
Hwang

(10) Patent No.: US 10,647,251 B2
(45) Date of Patent: May 12, 2020

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Duhyun Hwang, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/937,157

(22) Filed: Mar. 27, 2018

(65) Prior Publication Data

US 2019/0184899 A1    Jun. 20, 2019

(30) Foreign Application Priority Data

Dec. 20, 2017  (KR) .................. 10-2017-0176014

(51) Int. Cl.
| | | |
|---|---|---|
| *B60Q 9/00* | (2006.01) | |
| *G01S 15/88* | (2006.01) | |
| *G01S 15/08* | (2006.01) | |
| *B60N 2/00* | (2006.01) | |
| *G01S 7/534* | (2006.01) | |
| *G01S 15/04* | (2006.01) | |
| *G01S 7/539* | (2006.01) | |
| *G01S 7/524* | (2006.01) | |

(52) U.S. Cl.
CPC .............. *B60Q 9/00* (2013.01); *B60N 2/002* (2013.01); *G01S 7/524* (2013.01); *G01S 7/534* (2013.01); *G01S 7/539* (2013.01); *G01S 15/04* (2013.01); *G01S 15/08* (2013.01); *G01S 15/88* (2013.01)

(58) Field of Classification Search
CPC ........... B60Q 9/00; B60N 2/002; G01S 15/08; G01S 5/88; G01S 7/524; G01S 7/534; G01S 7/539; G01S 15/04
See application file for complete search history.

(56) References Cited

U.S. PATENT DOCUMENTS

| 6,029,105 A | * | 2/2000 | Schweizer | ............ B60N 2/002 280/734 |
| 6,922,147 B1 | * | 7/2005 | Viksnins | ................ B60N 2/002 340/573.1 |
| 2001/0013697 A1 | | 8/2001 | Saito et al. | |
| 2002/0082756 A1 | | 6/2002 | Breed et al. | |

(Continued)

FOREIGN PATENT DOCUMENTS

| JP | 2008-129948 A | 6/2008 |
| JP | 2012/101685 A | 5/2012 |
| JP | H5972372 B2 | 8/2016 |

*Primary Examiner* — Mohamed Barakat
(74) *Attorney, Agent, or Firm* — Morgan, Lewis & Bockius LLP

(57) ABSTRACT

A method for controlling a vehicle capable of detecting the presence of a passenger in the vehicle includes steps of: scanning an interior of the vehicle based on ultrasonic signals and constructing spatial data on the interior of the vehicle; and re-scanning the interior of the vehicle based on ultrasonic signals when preset conditions are satisfied and outputting a sensing result when a change of the ultrasonic signals, which is greater than a reference value, is detected in the previously constructed spatial data.

11 Claims, 8 Drawing Sheets

(56) References Cited

U.S. PATENT DOCUMENTS

| | | | |
|---|---|---|---|
| 2005/0131607 A1* | 6/2005 | Breed | B60N 2/002 |
| | | | 701/45 |
| 2015/0006167 A1 | 1/2015 | Kato et al. | |
| 2015/0274036 A1* | 10/2015 | Arad | B60N 2/002 |
| | | | 340/573.1 |
| 2016/0200276 A1 | 7/2016 | Diewald | |
| 2016/0280067 A1* | 9/2016 | Cuddihy | B60N 2/00 |
| 2017/0059704 A1* | 3/2017 | Xie | G01S 15/93 |

* cited by examiner

VEHICLE AND METHOD OF CONTROLLING THE SAME

CROSS-REFERENCE TO RELATED APPLICATION(S)

This application is based on and claims the benefit of priority to Korean Patent Application No. 10-2017-0176014, filed on Dec. 20, 2017 with the Korean Intellectual Property Office, the disclosure of which is incorporated herein by reference.

TECHNICAL FIELD

Embodiments of the present disclosure relate to a vehicle configured to detect the presence of a passenger in the vehicle and a method of controlling the same.

BACKGROUND

Every year, young children left in rear seats of vehicles die in the high temperatures since their distracted parents forget the presence of the young children in the rear seats.

In this regard, research has been conducted on methods of preventing young children from being left in vehicles in advance including a method of reminding the presence of the young children by using an alarm.

SUMMARY

According to an aspect of the present disclosure, a vehicle capable of detecting a passenger present in the vehicle by measuring a distance using a frequency mixer and a method of controlling the vehicle are provided herein.

Additional aspects of the disclosure will be set forth in part in the description which follows and, in part, will be obvious from the description, or may be learned by practice of the disclosure.

In accordance with one aspect of the present disclosure, a method of controlling a vehicle includes steps of: scanning an interior of the vehicle based on ultrasonic signals and constructing spatial data on the interior of the vehicle; and re-scanning the interior of the vehicle based on ultrasonic signals when preset conditions are satisfied and outputting a sensing result when a change of the ultrasonic signals, which is greater than a reference value, is detected in the previously constructed spatial data.

The step of constructing spatial data on the interior of the vehicle may construct spatial data on the interior of the vehicle by outputting ultrasonic signals having operating frequencies preset by an ultrasound sensor and receiving reflected and returning ultrasonic signals.

The step of constructing spatial data on the interior of the vehicle may further include constructing spatial data on the interior of the vehicle by outputting ultrasonic signals having frequencies modified by a frequency mixer provided in the ultrasound sensor and receiving reflected and returning ultrasonic signals.

The method of controlling a vehicle may further include a step of determining whether or not an opening event of a rear door of the vehicle is detected when the vehicle is switched on.

The step of constructing spatial data on the interior of the vehicle may scan the interior of the vehicle based on ultrasonic signals and constructing spatial data on the interior of the vehicle when the vehicle runs in a state where an opening event of a rear door of the vehicle is not detected.

The step of re-scanning the interior of the vehicle based on ultrasonic signals when preset conditions are satisfied comprises re-scanning the interior of the vehicle based on ultrasonic signals when the vehicle runs after an opening event of a rear door of the vehicle is detected.

The step of outputting a sensing result when a change of the ultrasonic signals, which is greater than a reference value, is detected in the previously constructed spatial data may include determining that a passenger is present in a rear seat of the vehicle and outputting the determination result when a change of the ultrasonic signals, which is greater than a reference value, is detected in the previously constructed spatial data.

The method of controlling a vehicle may further include a step of determining a change less than the reference value detected in the previously constructed spatial data as a noise.

The step of outputting a sensing result when a change of the ultrasonic signals, which is greater than a reference value, is detected in the previously constructed spatial data may include providing an alarm notifying of the presence of a passenger in the vehicle via a predetermined user terminal.

In accordance with one aspect of the present disclosure, a vehicle includes: an ultrasonic sensor configured to output ultrasonic signals having various frequency bands; and a controller configured to construct spatial data on an interior of the vehicle by scanning the interior of the vehicle based on the ultrasonic signals, re-scan the interior of the vehicle based on the ultrasonic signals when preset conditions are satisfied, and output a sensing result when a change of the ultrasonic signals, which is greater than a reference value, is detected in the previously constructed spatial data.

The controller controls the ultrasound sensor to output ultrasonic signals based on preset operating frequencies and constructs spatial data on the interior of the vehicle by receiving reflected and returning ultrasonic signals.

The ultrasound sensor may include a frequency mixer configured to output ultrasonic signals of various frequency bands.

The controller controls the ultrasound sensor to output ultrasonic signals having frequencies modified by the frequency mixer, and constructs spatial data on the interior of the vehicle by receiving reflected and returning ultrasonic signals.

The vehicle may further include a sensor configured to detect an opening event of a rear door of the vehicle, wherein when the vehicle runs in a state where an opening event of a rear door of the vehicle is not detected based on a sensing result of the sensor, the controller scans the interior of the vehicle based on ultrasonic signals and constructs spatial data on the interior of the vehicle.

When the vehicle runs after an opening event of a rear door of the vehicle is detected based on a sensing result of the sensor, the controller re-scans the interior of the vehicle based on the ultrasonic signals.

The controller determines that a passenger is present in the vehicle when the change of the ultrasonic signals, which is greater than a reference value, is detected in the previously constructed spatial data and outputs the determination result.

The controller provides an alarm notifying of the presence of a passenger in the vehicle via a predetermined user terminal.

When a change less than the reference value is detected in the previously constructed spatial data, the controller determines the change as a noise.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
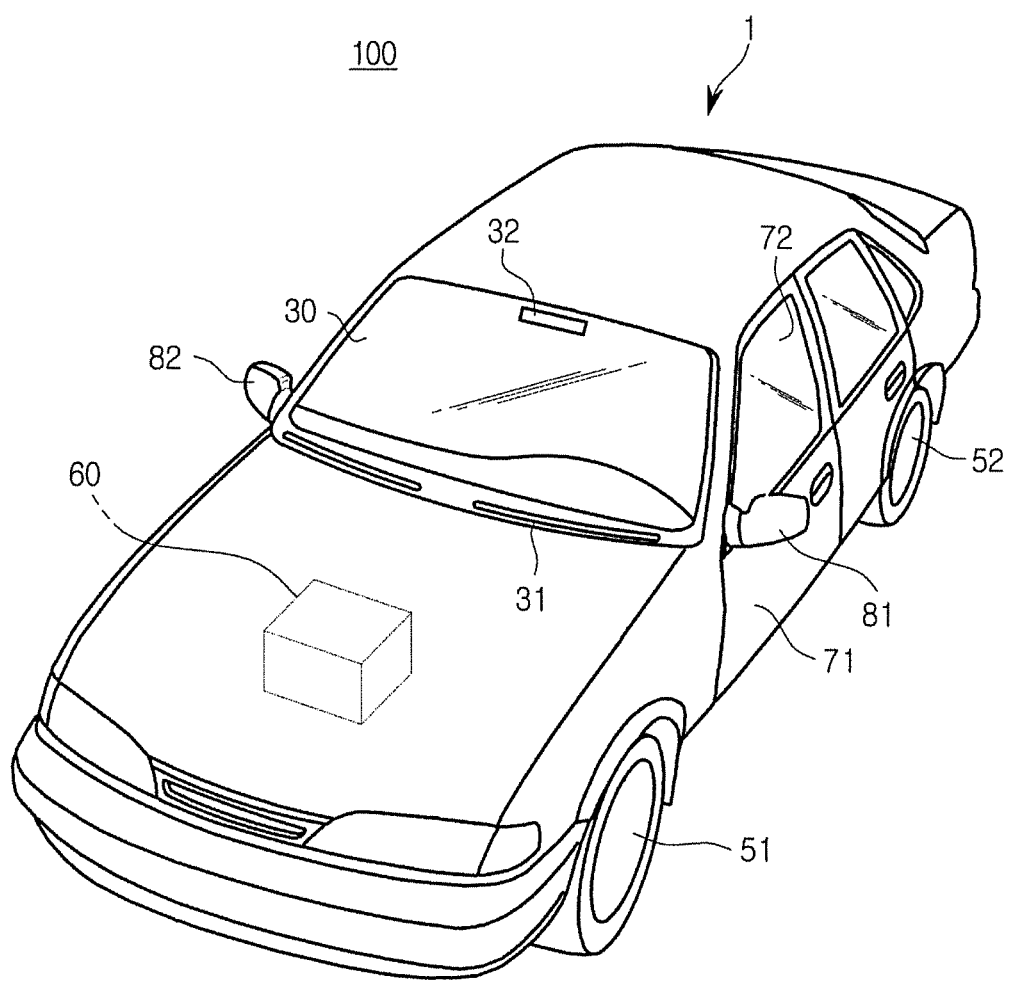
FIG. 1 is an exterior view of a vehicle according to an embodiment.

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted. The terms 'unit', 'module', 'member', or 'block' used in the specification may be implemented using a software or hardware component. According to an embodiment, a plurality of 'units', 'modules', 'members', or 'blocks' may also be implemented using an element and one 'unit', 'module', 'member', or 'block' may include a plurality of elements.

Throughout the specification, when an element is referred to as being 'connected to' another element, it may be directly or indirectly connected to the other element and the 'indirectly connected to' includes connected to the other element via a wireless communication network.

Also, it is to be understood that the terms 'include' or 'have' are intended to indicate the existence of elements disclosed in the specification, and are not intended to preclude the possibility that one or more other elements may exist or may be added.

The terms 'first', 'second' etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, operating principles and embodiments of the present disclosure will be described with reference to the accompanying drawings.

FIG. 1 is an exterior view of a vehicle 100 according to an embodiment.

Referring to FIG. 1, the vehicle 100 includes a body 1 configured to define an appearance of the vehicle 100, a front glass 30 configured to provide a driver in the vehicle 100 with views in front of the vehicle 100, wheels 51 and 52 configured to move the vehicle 100, a driving apparatus 60 configured to rotate the wheels 51 and 52, doors 71 configured to shield the inside of the vehicle 100 from the outside, and side mirrors 81 and 82 configured to provide the driver with views behind the vehicle 100.

The front glass 30 is disposed at a front upper portion of the body 1 to allow the driver inside the vehicle 100 to acquire visual information of a view in front of the vehicle 100 and is also called a windshield glass.

The wheels 51 and 52 include front wheels 51 disposed at front portions of the vehicle 100 and rear wheels 52 disposed at rear portions of the vehicle 100. The driving apparatus 60 may provide a rotational force to the front wheels 51 or the rear wheels 52 to move the body 1 forward or backward. The driving apparatus 60 may include an engine configured to generate the rotational force via combustion of a fossil fuel or a motor configured to generate the rotational force upon receiving the power from a battery (not shown).

The doors 71 are pivotally coupled to the vehicle 100 at left and right sides of the body 1 to allow a driver to get into the vehicle 100 by opening the door and the inside of the vehicle 100 may be shielded from the outside by closing the doors. The doors 71 may be provided with windows 72 through which the inside is visible from the outside or vice versa. The windows 72 may be provided to be viewed only from one side or may be opened or closed.

The side mirrors 81 and 82 include a left side mirror 81 disposed at the left side of the body 1 and a right side mirror 82 disposed at the right side of the body 1 and allow the driver inside the vehicle 100 to acquire visual information of areas beside and behind the vehicle 100.

Figure 2:
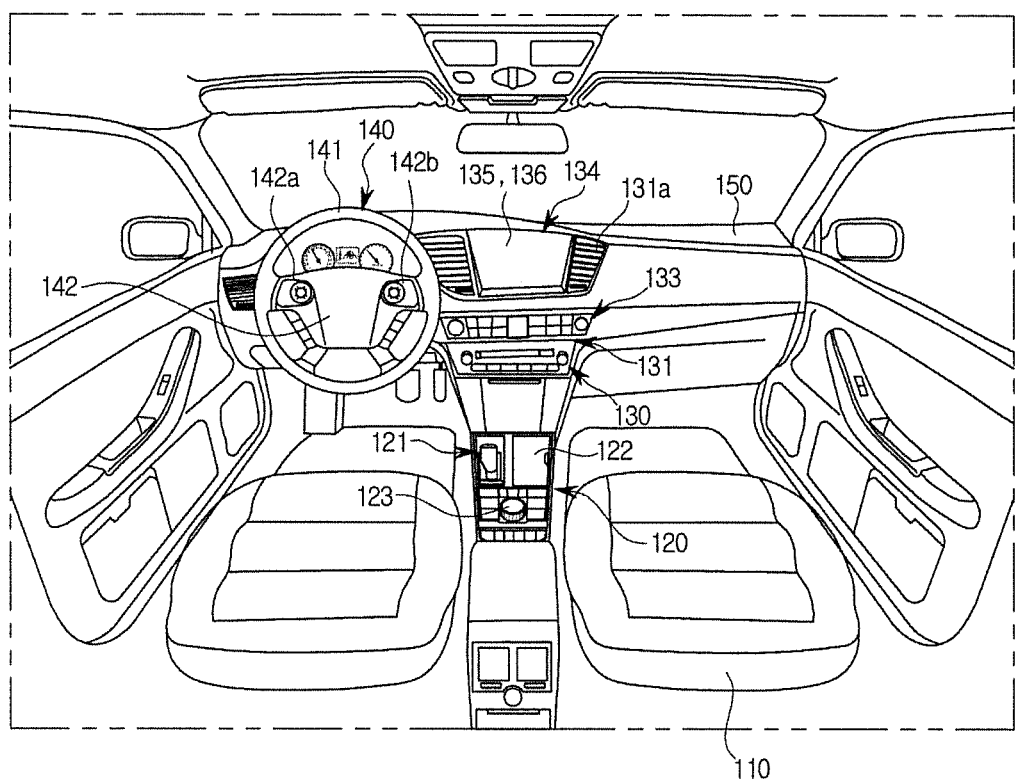
FIG. 2 is an interior view of the vehicle according to the embodiment.

FIG. 2 is an interior view of the vehicle 100 according to the embodiment. Referring to FIG. 2, the vehicle 100 may include seats 110, a gear box 120, and a dashboard 150 provided with a center fascia 130 and a steering wheel 140.

The gear box 120 may be provided with a transmission lever 121 for transmission of the vehicle 100 and a touch pad 122 configured to control functions of the vehicle 100. Meanwhile, a dial controller 123 may further be provided, if required.

The center fascia 130 may be provided with an air conditioner 131, a clock 132, an audio device 133, an audio, video, and navigation (AVN) device 134, and the like.

The air conditioner 131 maintains the interior of the vehicle 100 in a clean state by adjusting temperature, humidity, and cleanness of air in the vehicle 100. The air conditioner 131 may include at least one air vent 131a installed at the center fascia 130 through which air is discharged. The center fascia 130 may be provided with a button, dial, or the like to control the air conditioner 131 or the like. A user such as the driver may control the air conditioner 130 by using the button disposed at the center fascia 130.

The clock 132 may be provided around the button or dial to control the air conditioner 131.

The audio device 133 may include a control panel provided with a plurality of buttons to perform functions of the audio device 133. The audio device 133 may provide a radio mode to provide radio functions and a media mode to reproduce audio files stored in various storage media.

The AVN device 134 may be embedded in the center fascia 130 of the vehicle 100. The AVN device 134 is a device capable of synthetically performing audio functions, video functions, and navigation functions in accordance with a user's control. The AVN device 134 may include an input unit 135 configured to receive a user command with respect to the AVN device 134 and a display 136 configured to display screens related to audio, video, and navigation functions.

The steering wheel 140 is a device configured to control a driving direction of the vehicle 100 and includes a rim 141 gripped by the driver and a spoke 142 connected to a steering apparatus of the vehicle 100 and connecting the rim 141 with a hub of a rotating shaft for steering. According to an embodiment, the spoke 142 may be provided with control devices 142a and 142b to control various devices, e.g., the audio device 133.

The dashboard 150 may further be provided with an instrument cluster to display driving speed of the vehicle 100, an engine RPM, a fuel level, or the like and a glove box for miscellaneous storage.

Figure 3:
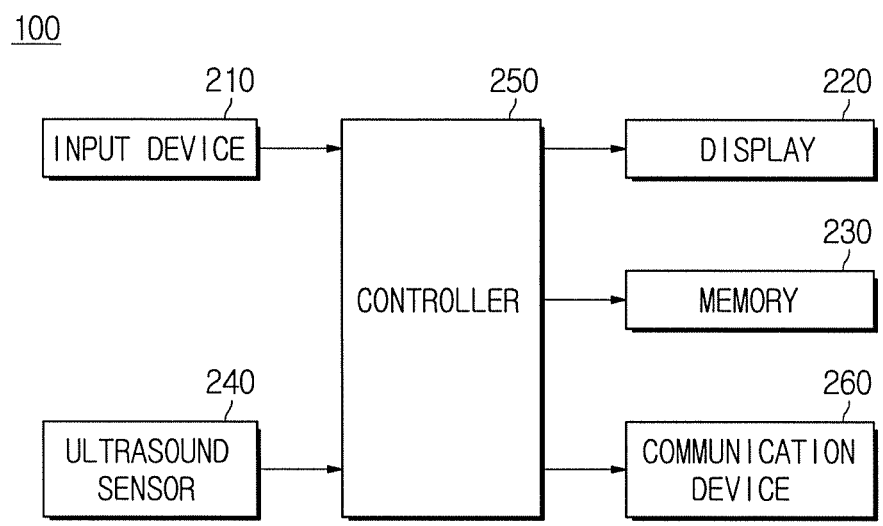
FIG. 3 is a control block diagram of a vehicle according to an embodiment.

Hereinafter, the vehicle according to the present embodiment will be described in more detail with reference to FIG. 3. FIG. 3 is a control block diagram of a vehicle according to an embodiment.

Referring to FIG. 3, the vehicle 100 includes an input device 210, a display 220, a memory 230, an ultrasound sensor 240, a controller 250, and a communication device 260.

The input device 210 may receive commands to control various functions provided in the vehicle 100 from the user.

The input device 210 may include various control buttons installed in the vehicle 100 and may be a concept including the input unit 135 of the AVN device 134. Also, the input device 210 may include a graphic user interface (GUI), i.e., a software device, such as a touch pad for a user input. The touch pad may be implemented using a touch screen panel (TSP) to constitute a layered structure with the display 220 which will be described later.

The display 220 may display operation information of various functions provided in the vehicle 100. When a process of constructing spatial data on the interior of the vehicle 100 is performed, the display 220 may display a current status of the process. Upon completion of construction of spatial data, the display 220 may display a message notifying of the completion of construction of spatial data. In addition, when a passenger is present in a rear seat, the display 220 may display a message notifying the driver of the presence of the passenger in the rear seat.

The display 220 may be implemented using a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, or an organic light emitting diode (OLED) panel, or the like, without being limited thereto.

The memory 230 may store a variety of data, programs, or applications to control various functions provided in the vehicle 100 under the control of the controller 250. More particularly, the memory 230 may store control programs to control the ultrasound sensor 240 provided in the vehicle 100, specialized applications initially provided by a manufacturer, general purpose applications downloaded from external sources, objects to provide applications, and the like.

For example, the memory 230 may store control programs to control driving timing of the ultrasound sensor 240, control programs to determine frequency signals output from the ultrasound sensor 240 and mix the frequency signals, and control programs to construct spatial data on the interior of the vehicle 100 based on the frequency signals and detect the presence of a passenger of a rear seat of the vehicle 100 based on the constructed spatial data.

In addition, the memory 230 may perform a function of temporarily store ultrasonic signals received from the ultrasound sensor 240 or a function of storing spatial data on the interior of the refrigerator 100 constructed based on the ultrasonic signals. The memory 230 may store spatial data on the interior of the vehicle 100 on the basis of frequency signals output from the ultrasound sensor 240.

The memory 230 may include at least one storage medium selected from the group consisting of flash memory, hard disc, memory card, read-only memory (ROM), random access memory (RAM), electrically erasable programmable read-only memory (EEPROM), programmable read-only memory (PROM), magnetic memory, magnetic disc, and optical disc.

The ultrasound sensor 240 is installed in the vehicle 100 to detect the presence of a passenger in the vehicle 100. For example, the ultrasound sensor 240 may be installed around a rear seat of the vehicle 100 to detect the presence of a passenger in a rear seat of the vehicle 100, but the installation position of the ultrasound sensor 240 is not limited thereto.

The ultrasound sensor 240 may include a frequency mixer to output ultrasonic signals of various frequency bands. In other words, the ultrasound sensor 240 may be configured to modify a frequency via the frequency mixer and output the modified frequency under the control of the controller 250. Since the frequency mixer is applied to the ultrasound sensor 240 according to the embodiment, ultrasonic signals of various frequency bands may be output by using one type of the ultrasound sensor 240. As ultrasonic signals of various frequency bands are output, spatial information may be acquired by reflecting characteristics of objects by which the frequency signals are reflected.

Figure 4:
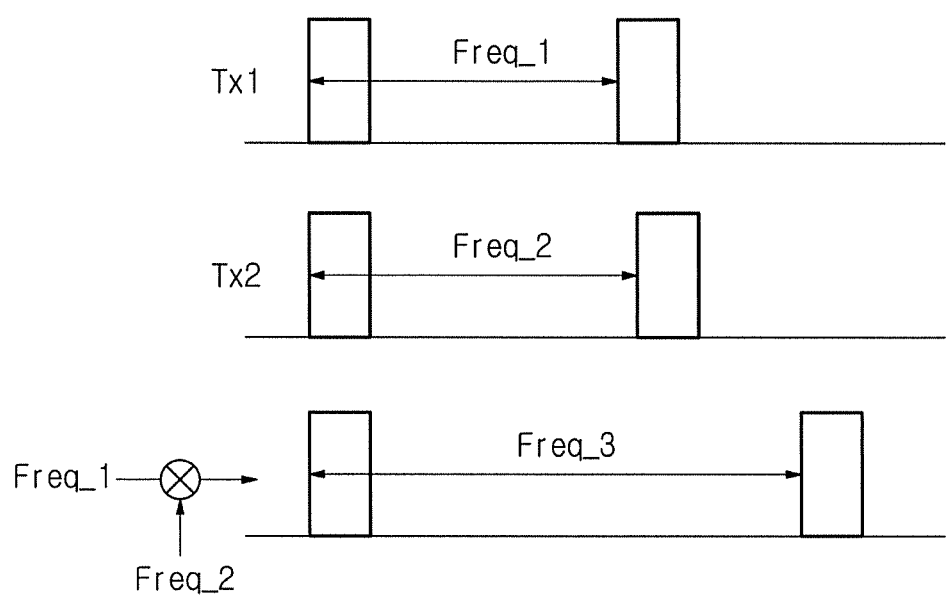
FIG. 4 is a diagram for describing a method of mixing frequencies and outputting a mixed frequency performed by the ultrasound sensor according to an embodiment.

FIG. 4 is a diagram for describing a method of mixing frequencies and outputting a mixed frequency performed by the ultrasound sensor 240 according to an embodiment. Although FIG. 4 exemplarily illustrates an ultrasound sensor 240 including two transmitter sensors and one receiver sensor, examples of the ultrasound sensor 240 are not limited thereto.

Referring to FIG. 4, first, a first transmitter sensor Tx1 of the ultrasound sensor 240 is configured to transmit a first frequency signal and a second transmitter sensor Tx2 is configured to transmit a second frequency signal.

Meanwhile, the ultrasound sensor 240 may mix the first frequency signal with the second frequency signal by using the frequency mixer to generate a third frequency signal and output the third frequency signal via the first transmitter sensor Tx1 or the second transmitter sensor Tx2.

In the same manner, the ultrasound sensor 240 may mix the first frequency signal with the third frequency signal by using the frequency mixer to generate a fourth frequency signal or mix the second frequency signal with the third frequency signal to generate a fifth frequency signal. The ultrasound sensor 240 may transmit the fourth frequency signal or the fifth frequency signal via the first transmitter sensor Tx1 or the second transmitter sensor Tx2.

The ultrasound sensor 240 according to the present embodiment may generate various frequencies in this manner and may construct spatial data on the interior of the vehicle 100 or measure a distance from an object or a passenger present in the vehicle 100 by analyzing waveforms of reflected signals after transmitting the frequency signals.

The controller 250 controls the overall operation of the vehicle 100. The controller 250 may control the components in the vehicle 100, i.e., the input device 210, the display 220, the memory 230, the ultrasound sensor 240, the communication device 260, and the like. The controller 250 may include various processors (e.g., a CPU, etc.) including at least one chip on which an integrated circuit is formed.

The controller 250 may be implemented using a memory that stores algorithms to control the operation of the components of the vehicle 100 or data on programs to run the algorithms and a processor that performs the aforementioned operation by using data stored in the memory. In this case, the memory and the processor may be implemented as separate chips or as a single chip.

The controller 250 may construct spatial data on the interior of the vehicle 100 by controlling the operation of the ultrasound sensor 240 and detect the presence of a passenger in the rear seats of the vehicle 100 based on the constructed spatial data.

Figure 5:
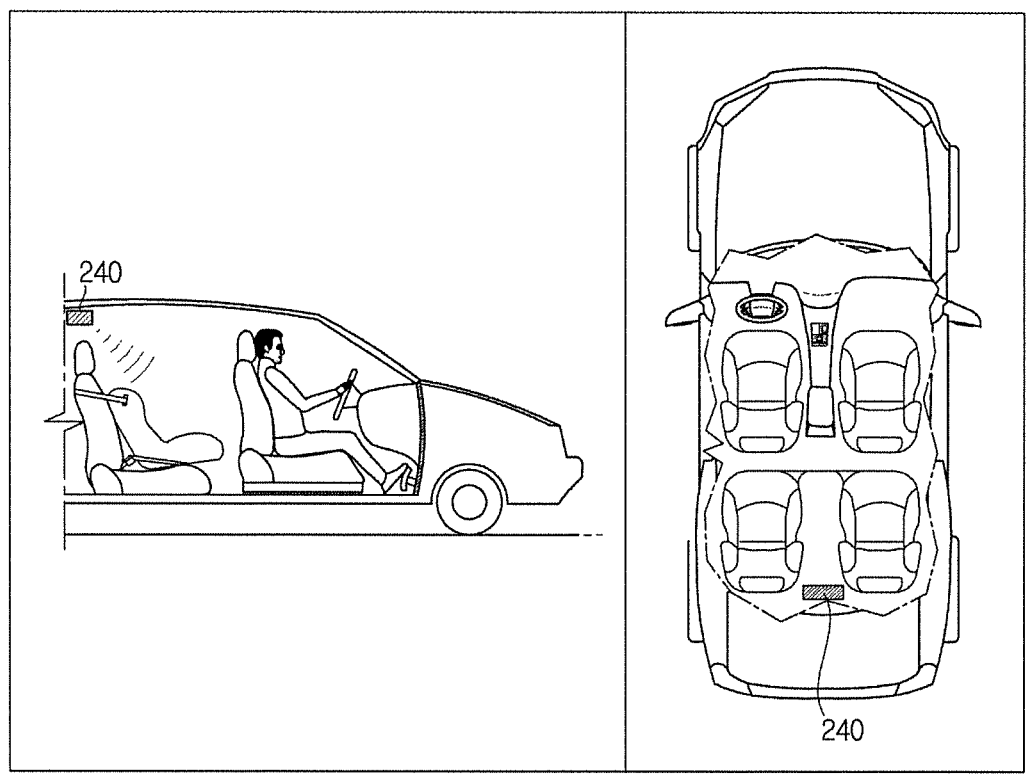
FIG. 5 is a diagram for describing a method of constructing spatial data on the interior of the vehicle.

First, a method of constructing spatial data on the interior of the vehicle 100 based on ultrasonic signals generated by the ultrasound sensor 240, the method performed by the controller 250, will be described. FIG. 5 is a diagram for describing a method of constructing spatial data on the interior of the vehicle 100.

As illustrated in FIG. 5, the ultrasound sensor 240 may scan the interior of the vehicle 100 by using ultrasonic signals of various frequency bands under the control of the controller 250, and the controller 250 may construct spatial data on the interior of the vehicle 100 based on ultrasonic signals received from the ultrasound sensor 240. In addition, the constructed spatial data on the interior of the vehicle 100 is stored in the memory 230 under the control of the controller 250.

Since the present disclosure is intended to detect the presence of a passenger is present in the rear seat of the vehicle 100, the spatial data on the interior of the vehicle 100 may be a concept including spatial data on the rear seats of the vehicle 100. However, the spatial data on the interior of the vehicle 100 may be constructed for various spaces inside the vehicle 100 according to the intention of a designer.

The controller 250 may construct spatial data on the interior of the vehicle 100 when predetermined conditions are satisfied. For example, upon determination that the vehicle 100 is running in a state where an opening event of a rear door is not detected, the controller 250 may scan the interior of the vehicle 100 based on the ultrasonic signals and construct spatial data on the interior of the vehicle 100. In order to detect the presence of a passenger in the vehicle 100, reference data is required. According to the present embodiment, when an opening event of a rear door of the vehicle 100 is not detected, scan data on the interior of the vehicle 100 as reference data to detect the presence of a passenger in the vehicle 100.

Figure 6:
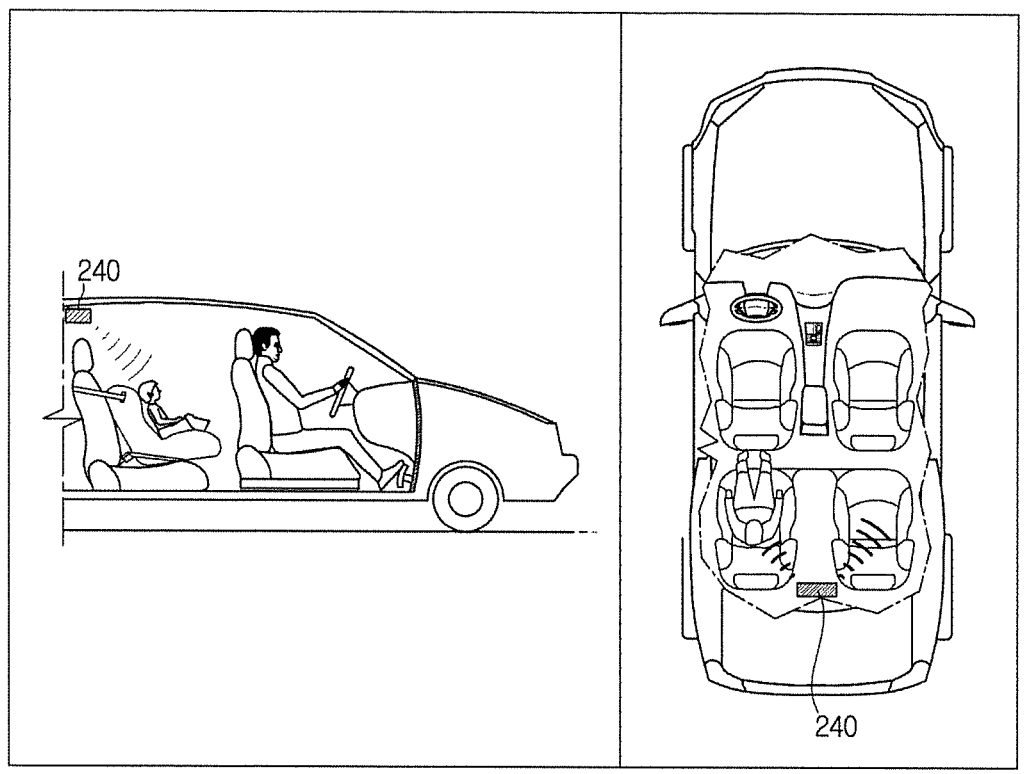
FIG. 6 is a diagram for describing a method of detecting the presence of a passenger in the vehicle.

Next, a method of detecting the presence of a passenger in the vehicle 100 based on the constructed spatial data on the interior of the vehicle 100, the method performed by the controller 250, will be described. FIG. 6 is a diagram for describing a method of detecting the presence of a passenger in the vehicle 100.

When predetermined conditions are satisfied, the controller 250 re-scans the interior of the vehicle 100 based on the ultrasonic signals. For example, when the vehicle 100 is running after an opening event of a rear door of the vehicle 100 is detected, the controller 250 may control the ultrasound sensor 240 to re-scan the interior of the vehicle 100 based on ultrasonic signals. The ultrasound sensor 240 may re-scan the interior of the vehicle 100 under the control of the controller 250 and output result values of the re-scanning of the interior of the vehicle 100 to the controller 250. Referring to FIG. 6, when a passenger is present in the vehicle 100, an ultrasonic signal output from the ultrasound sensor 240 is reflected by the passenger and arrives at the receiver sensor of the ultrasound sensor 240.

The controller 250 may determine that a passenger is present in a rear seat of the vehicle 100 when a change of the ultrasonic signals, which is greater than a reference value, is detected in spatial data previously constructed based on sensor value information collected by the receiver sensor of the ultrasound sensor 240.

When the presence of the passenger in the rear seat of the vehicle 100 is detected, the controller 250 may provide an alarm notifying the driver of the presence of a passenger in a rear seat via the display 220 of the vehicle 100 via the display 220. According to an embodiment, an alarm notifying of the presence of a passenger in a rear seat of the vehicle 100 may be provided via a predetermined user terminal via a communication device 260, which will be described later. In this regard, the user terminal may be implemented using a computer or a portable terminal accessible to the vehicle 100 via a network and may be, for example, a concept including a previously registered user terminal including a driver's terminal.

The communication device 260 may include at least one component enabling communications with internal components of the vehicle 100 and an external device. When the presence of a passenger in a rear seat of the vehicle 100 is detected, the controller 250 may control the communication device 260 to provide an alarm notifying of the presence of a passenger is in a rear seat of the vehicle 100 via the AVN device installed in the vehicle 100 or provide the alarm via a previously registered user terminal according to an embodiment.

The communication device 260 may include at least one of a short-range communication module, a wired communication module, and a wireless communication module.

The short-range communication module may include various modules that transmit and receive signals using a wireless communication network in a short distance such as a Bluetooth module, an infrared communication module, a radio frequency identification (RFID) communication module, a wireless local access network (WLAN) communication module, a near field communication (NFC) module, a Zigbee communication module.

The wired communication module may include not only various wired communication modules such as a controller area network (CAN) communication module, a local area network (LAN) module, a wide area network (WAN) module, or a value added network (VAN) module but also various cable communication modules such as universal serial bus (USB), high definition multimedia interface (HDMI), digital visual interface (DVI), recommended standard 232 (RS-232), power line communication, or plain old telephone service (POTS).

The components of the vehicle 100 according to an embodiment have been described above. Meanwhile, although not shown in the above-described control block diagram, the vehicle 100 may further include a sensor configured to sense an opening event of a door of the vehicle 100. The sensor may detect opening events of a driver door, a front passenger door, and rear doors and provide detected sensed information to the controller 250 to control the operation of the ultrasound sensor 240.

Next, a method of controlling the vehicle 100 according to an embodiment will be described.

First, a process of constructing spatial data on the interior of the vehicle 100 performed by the ultrasound sensor 240 installed in the vehicle 100 will be described, and then a process of detecting the presence of a passenger in a rear seat of the vehicle 100 based on the constructed spatial data will be described.

Figure 7:
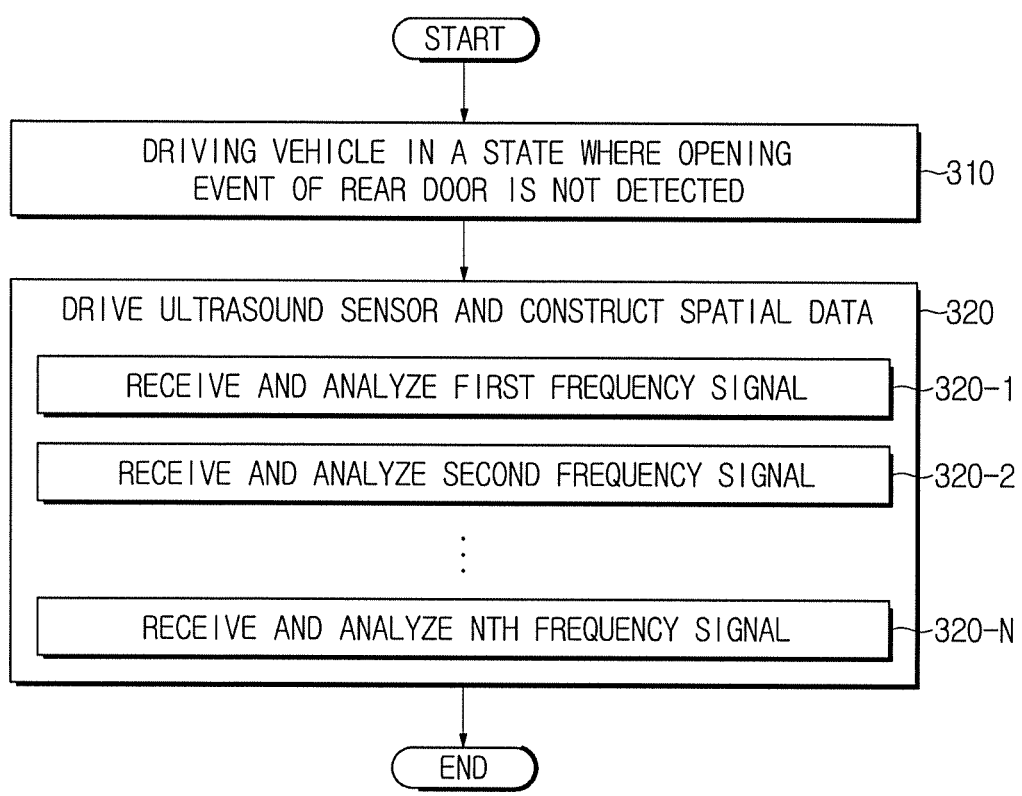
FIG. 7 is a flowchart for describing a process of constructing spatial data on the interior of the vehicle.

FIG. 7 is a flowchart for describing a process of constructing spatial data on the interior of the vehicle 100.

Referring to FIG. 7, the process of constructing spatial data on the interior of the vehicle 100 includes driving the vehicle 100 in a state where an opening event of a rear door is not detected (310), and driving the ultrasound sensor 240 and constructing the spatial data (320).

First, when the vehicle 100 runs, the vehicle controller 250 determines whether an opening event of a rear door has occurred before the vehicle 100 runs based on sensing results of a sensor installed around a rear seat. Upon determination that the vehicle 100 runs in a state where the opening event of the rear door has not occurred before the vehicle 100 runs, the vehicle controller 250 performs a process of constructing spatial data on the interior of the vehicle 100 (310).

The controller 250 controls the ultrasound sensor 240 to transmit a first frequency signal to construct spatial data on the interior of the vehicle 100 and constructs spatial data on the interior of the vehicle 100 by receiving and analyzing a reflected signal of the first frequency signal (320-1).

Next, the controller 250 controls the ultrasound sensor 240 to transmit a second frequency signal to an $N^{th}$ frequency signal (where N is an integer of 3 or greater) and constructs spatial data on the interior of the vehicle 100 by receiving and analyzing reflected signals of the second frequency signal to the $N^{th}$ frequency signal (320-2, . . . 320-N).

The frequency sensor may transmit frequency signals of various bands via a frequency mixer, thereby acquiring spatial data in which characteristics of an object reflecting the ultrasonic signals are reflected.

Figure 8:
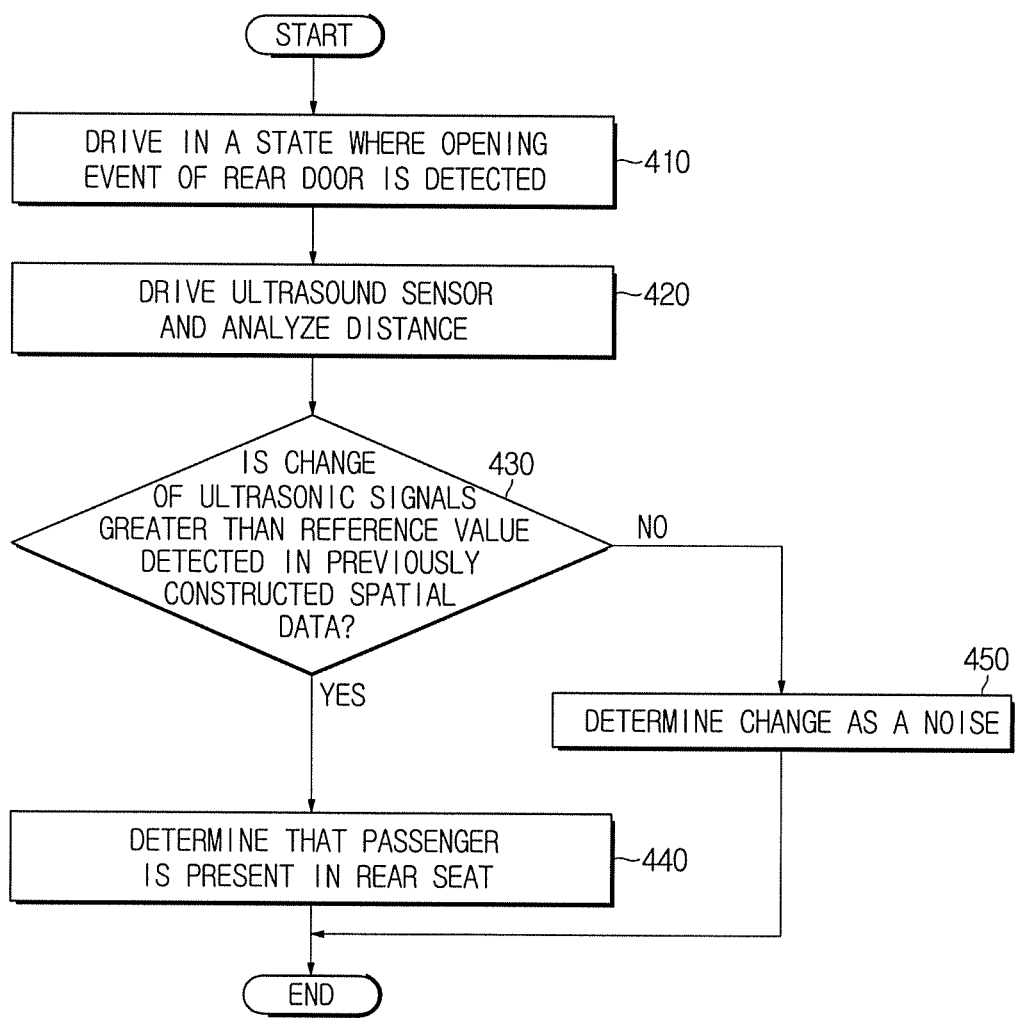
FIG. 8 is a flowchart illustrating a process of detecting the presence of a passenger in a rear set of the vehicle based on spatial data constructed according to the process illustrated in FIG. 7.

Next, FIG. 8 is a flowchart illustrating a process of detecting the presence of a passenger in a rear set of the vehicle 100 based on spatial data constructed according to the process illustrated in FIG. 7.

Referring to FIG. 8, a process of detecting the presence of a passenger in a rear seat of the vehicle 100 includes driving the vehicle 100 in a state where an opening event of the rear door of the vehicle 100 has occurred (410) and driving the ultrasound sensor 240 and analyzing a distance from an object (420).

First, when the vehicle 100 runs, the vehicle controller 250 determines whether an opening event of a rear door has occurred before the vehicle 100 runs based on sensing results of a sensor installed around a rear seat. Upon determination that the vehicle 100 runs after the opening event of the rear door has occurred, the vehicle controller 250 performs a process of detecting the presence of a passenger in the vehicle 100.

The controller 250 controls the ultrasound sensor 240 to transmit ultrasonic signals to detect the presence of a passenger is present in a rear seat of the vehicle 100 and performs a process of analyzing a distance from the ultrasound sensor 240 to the object by receiving and analyzing reflected signals of the transmitted ultrasonic signals (420).

When a change of the ultrasonic signals, which is greater than a reference value, is detected in the spatial data previously constructed based on sensor value information received by the ultrasound sensor 240, the controller 250 may determine that a passenger is present in the rear seat of the vehicle 100 (430 and 440). On the contrary, when a change of the ultrasonic signals, which is less than the reference value, is detected in the spatial data previously constructed based on sensor value information received by the ultrasound sensor 240, the controller 250 may determine the change as a noise (430 and 450). When the passenger is present in the rear seat of the vehicle 100, time intervals taken for the ultrasonic signal to return to the ultrasound sensor 240 may decrease. The vehicle controller 250 may determine whether or not the passenger is present in a rear seat of the vehicle 100 by collecting information on such changes.

Meanwhile, although not shown in the drawings, the controller 250 may control the display 220 of the vehicle 100 to output sensing results when the presence of a passenger in a rear seat of the vehicle 100 is detected. The controller 250 may also control the communication device 260 to provide an alarm notifying of the presence of the passenger via a predetermined user terminal.

As is apparent from the above description, according to the vehicle and the method of controlling the vehicle according to the present disclosure, leaving of young children may not prevented in advance.

Particularly, the presence of a passenger in a rear seat may be detected even when motion of the passenger is not sensed, thereby making it possible to more thoroughly prevent young children from being left in vehicles.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of controlling a vehicle, the method comprising steps of:
    determining whether or not an opening event of a rear door of the vehicle is detected after the vehicle is switched on;
    scanning an interior of the vehicle based on ultrasonic signals, and constructing first spatial data on the interior of the vehicle when the opening event of the rear door is not detected after the vehicle is switched on and before the vehicle moves;
    storing the first spatial data;
    scanning the interior of the vehicle based on ultrasonic signals and constructing second spatial data on the interior of the vehicle when the opening event of the rear door is detected after the vehicle is switched on and before the vehicle moves;
    determining that a passenger is present in the rear seat of the vehicle according to a change between the first spatial data and the second spatial data; and
    outputting a determined result that the passenger is present in the rear seat when the change between the first special data and the second spatial data is greater than a reference value.

2. The method of claim 1, wherein the step of constructing the first and second spatial data on the interior of the vehicle comprises constructing the first and second spatial data on the interior of the vehicle by outputting ultrasonic signals having operating frequencies preset by an ultrasound sensor and receiving reflected and returning ultrasonic signals.

3. The method of claim 2, wherein the step of constructing the first and second spatial data on the interior of the vehicle further comprises constructing the first and second spatial data on the interior of the vehicle by outputting ultrasonic signals having frequencies modified by a frequency mixer provided in the ultrasound sensor and receiving reflected and returning ultrasonic signals.

4. The method of claim 1, wherein the step of determining that a passenger is present in the rear seat of the vehicle according to a change between the first spatial data and the second spatial data comprises
determining that the passenger is not present in the rear seat when the change between the first spatial data and the second spatial is less than the reference value.

5. The method of claim 1, wherein the step of outputting comprises providing an alarm notifying of the presence of a passenger in the vehicle via a predetermined user terminal.

6. A vehicle comprising:
an ultrasound sensor configured to output ultrasonic signals having various frequency bands;
a sensor configured to detect an opening event of a rear door of the vehicle;
a memory configured to store a spatial data; and
a controller configured to:
determine whether or not an opening event of a rear door of the vehicle is detected after the vehicle is switched on,
construct first spatial data on an interior of the vehicle by scanning the interior of the vehicle based on the ultrasonic signals when the opening event of the rear door is not detected after the vehicle is switched on and before the vehicle moves,
storing the first spatial data in the memory,
construct second spatial data on the interior of the vehicle by scanning the interior of the vehicle based on the ultrasonic signals when the opening event of the rear door is detected after the vehicle is switched on and before the vehicle moves,
determine that a passenger is present in the rear seat of the vehicle according to a change between the first spatial data and the second spatial data, and
output a determined result that the passenger is present in the rear seat when the change between the first special data and the second spatial data is greater than a reference value.

7. The vehicle of claim 6, wherein the controller is further configured to control the ultrasound sensor to output ultrasonic signals based on preset operating frequencies and to construct the first and second spatial data on the interior of the vehicle by receiving reflected and returning ultrasonic signals.

8. The vehicle of claim 6, wherein the ultrasound sensor comprises a frequency mixer configured to output ultrasonic signals of various frequency bands.

9. The vehicle of claim 8, wherein the controller is further configured to control the ultrasound sensor to output ultrasonic signals having frequencies modified by the frequency mixer, and to construct the first and second spatial data on the interior of the vehicle by receiving reflected and returning ultrasonic signals.

10. The vehicle of claim 6, wherein the controller is further configured to provide an alarm notifying of the presence of a passenger in the vehicle via a predetermined user terminal.

11. The vehicle of claim 6, wherein the controller is further configured to determine that the passenger is not present in the rear seat when the change between the first spatial data and the second spatial data is less than the reference value.

* * * * *